Aug. 20, 1929.  J. P. BUCKLEY ET AL  1,725,563
SIGNAL FOR AIRSHIPS
Filed Jan. 18, 1928  3 Sheets-Sheet 1
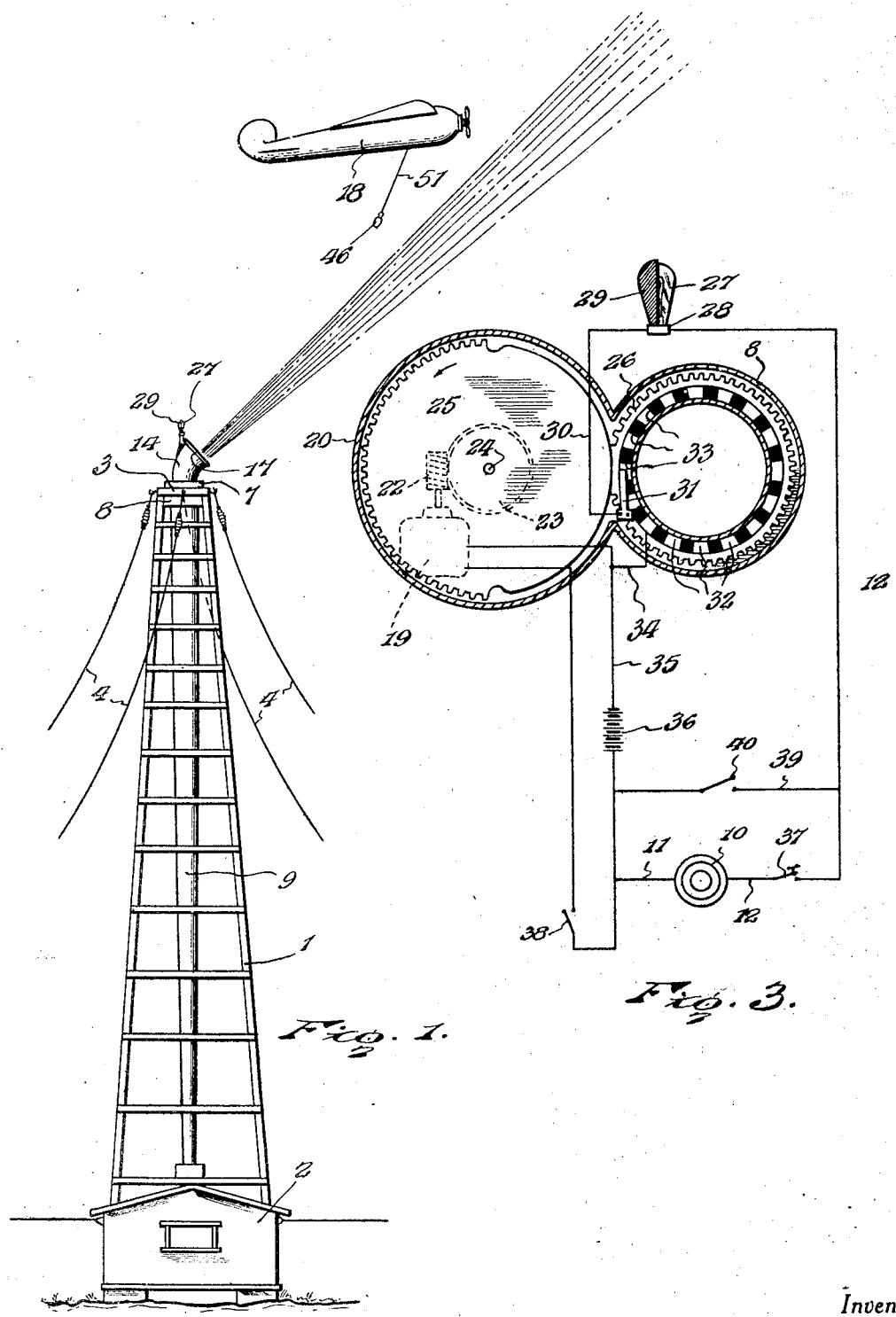
Inventors
John P. Buckley.
Arthur E. Nesbitt.
By Ross J. Woodward, Attorney

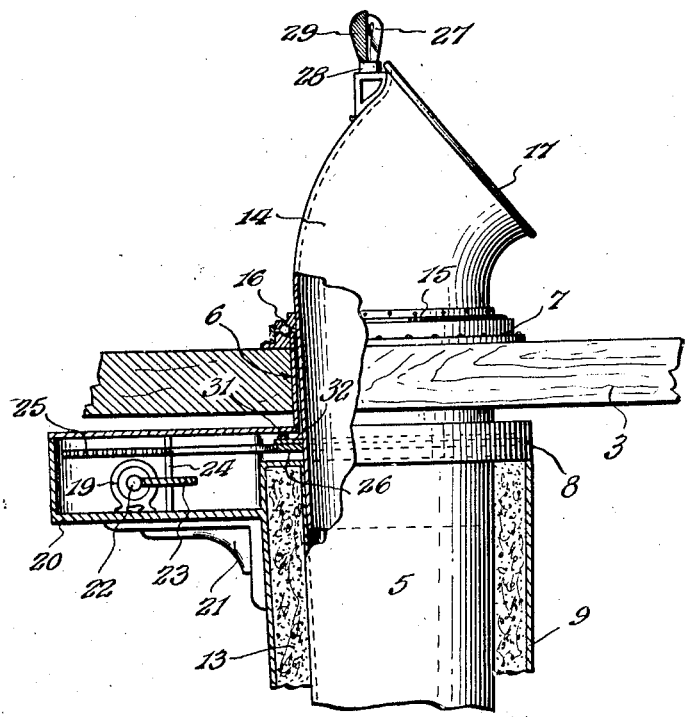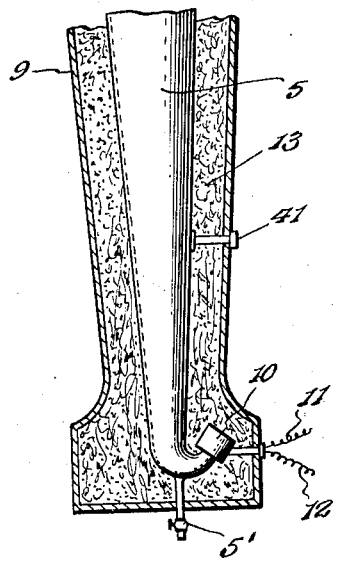

Aug. 20, 1929.  J. P. BUCKLEY ET AL  1,725,563
SIGNAL FOR AIRSHIPS
Filed Jan. 18, 1928  3 Sheets-Sheet 3
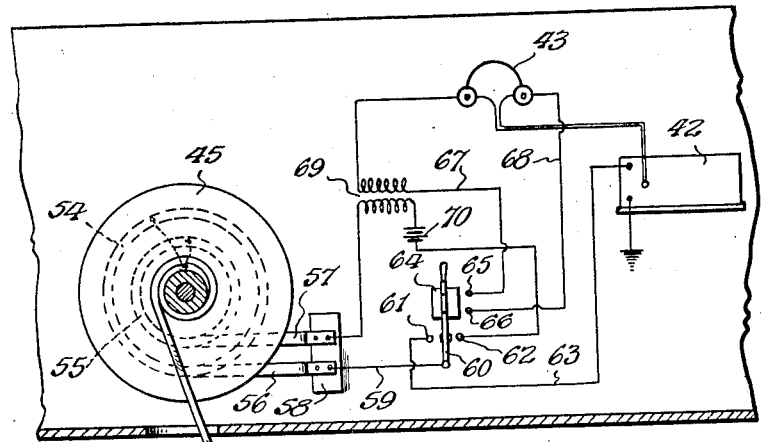
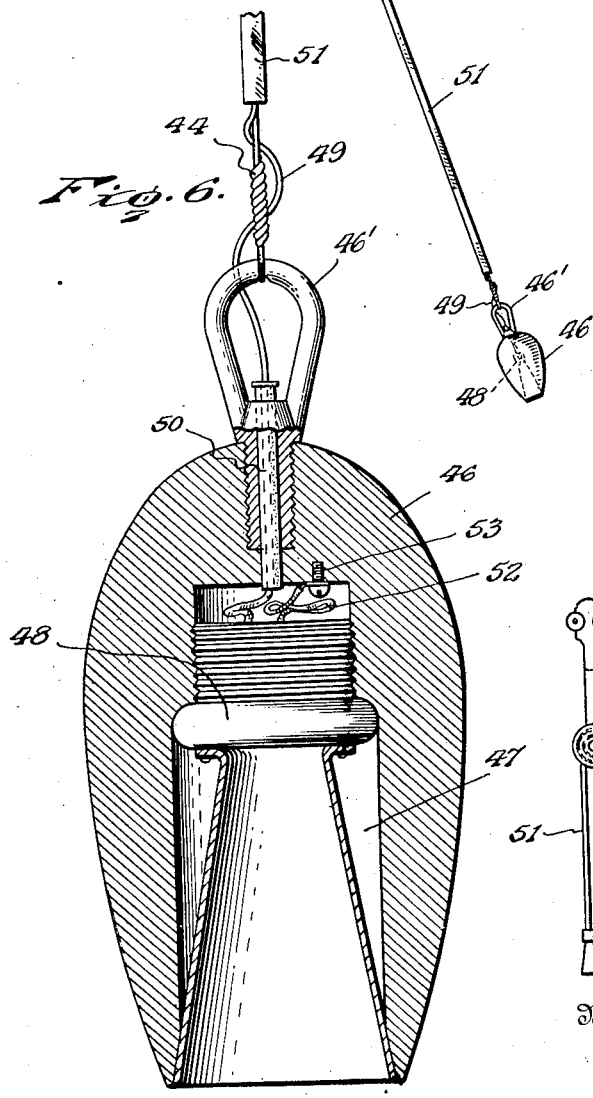
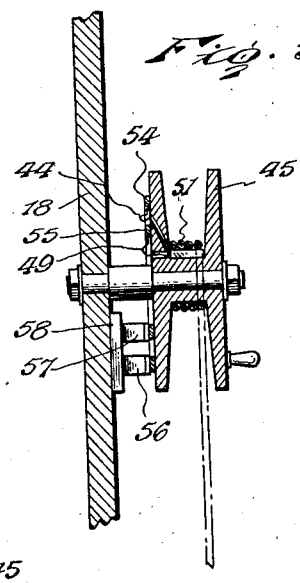
Inventor
John P. Buckley.
Arthur E. Nesbitt.

Patented Aug. 20, 1929.

1,725,563

UNITED STATES PATENT OFFICE.

JOHN P. BUCKLEY AND ARTHUR E. NESBITT, OF WASHINGTON, DISTRICT OF COLUMBIA.

SIGNAL FOR AIRSHIPS.

Application filed January 18, 1928. Serial No. 247,685.

This invention relates to signals and more particularly to a signal by means of which communication may be established between an aviation field and an air ship in flight.

At the present time it is customary to provide beacons at aviation fields but it has been found that during stormy or foggy weather it is difficult to determine their position relative to the ground so that a safe landing can be effected.

Therefore, an object of this invention is to provide an audible signal which can be heard by an aviator when a light cannot be easily seen and so controlled that when it is heard the aviator can determine in which direction a landing should be made and the amount of care to be exercised when landing.

Another object of the invention is to cause the audible signal to be intermittently energized so that the aviation field at which the signal is located may be identified by a distinctive series of blasts and during a normally long period of energization allow the sounding of the audible signal to be manually controlled so it may be employed to indicate to an aviator the approximate distance from the fog or clouds to the ground and the resulting care to be exercised when approaching the landing field.

Another object of the invention is to allow the improved signal means to be associated with a radio tower of a conventional construction, the audible signal including a sound producing element and a horn disposed vertically in the tower and supported thereby, and a lamp being mounted upon the top of the horn to serve as a visible signal when needed.

Another object of the invention is to confine sound waves within the horn until they emerge from the open upper end thereof and cause them to be directed upwardly in a determined direction so that they may be easily heard by an aviator in an approaching air-ship and not confused with ground noises.

Another object of the invention is to provide the aviator with receiving apparatus including sound wave affected means adapted to be suspended at such distance from the airship that it may pick up the audible tower signals without being unduly affected by noise from the propelling engine of the airship.

Another object of the invention is to permit the antenna wire of an airship receiving set to be employed as means for suspending the sound wave affected element beneath the airship.

Other objects will appear in the course of the following specification wherein like numerals refer to like parts, the invention being illustrated in the accompanying drawings, wherein Figure 1 is a side elevation of a radio tower having an embodiment of the improved signal means associated therewith;

Fig. 2 is an enlarged vertical sectional view through the horn and associated parts;

Fig. 3 is a diagrammatic view of the energizing circuit for the lamp and horn and control means therefor;

Fig. 4 is a diagrammatic view of the signal receiving apparatus;

Fig. 5 is a sectional view through the drum taken on the line 5—5 of Fig. 4;

Fig. 6 is an enlarged sectional view through the weight of the antenna wire with the transmitter carried thereby shown in elevation, and Fig. 7 is a diagrammatic view of a modified receiving circuit.

The signaling apparatus constituting the subject-matter of this invention is intended to establish communication between a flying field and an airship approaching the field and includes signal means at the field and receiving means whereby the aviator can receive the signals and definitely determine his position and the proper direction to descend when making a landing.

The signaling means is associated with a tower 1 which is of a conventional construction and is preferably a radio tower already erected at the field and rising from a building or other base 2. A platform 3 is provided at the top of the tower and the usual antenna loop connections are indicated at 4. The horn 5 extends vertically in the tower with its upper portion extending through an opening 6 formed in the platform and surrounded by a collar 7 rigidly secured upon the platform in any desired manner. Below the platform the horn is formed with a radial extension or annular pocket 8 engaged by the upper end of a jacket 9 which surrounds the horn and audible signal 10 at the lower end thereof, as shown in Fig. 2. The audible signal may be of any desired type, such as a whistle, operated by steam or compressed air but has been illustrated as an electrically energized noise emitting device having lead wires 11 and 12 extending therefrom externally of the jacket. A drain pipe 5' is provided to prevent water accumulating in the horn. Insulation 13 of any suitable type which will confine sound waves is packed into the jacket about the horn for the full height of the jacket.

The head 14 of the horn telescopes into its open upper end and, as seen in Fig. 2, extends below the pocket 8. A collar 15 is secured about the head above the collar 7 and these collars have their facing surfaces formed with bearing races in which fit bearing balls 16. It will thus be seen that the head will be permitted to rotate freely in the upper end portion of the horn. At its upper end the head is curved laterally and terminates in an open mouth 17 disposed diagonally upwards so that a beam of sound waves will be directed upwardly at an incline, as shown in Fig. 1, and may be easily heard by the occupant of an airship, such as the aeroplane 18, approaching the tower. Since the head is rotated when the device is in operation, the beam of sound waves will follow a path defined by substantially concentric cones having their apexes directed downwardly and, therefore, an aeroplane approaching from any direction will at some time be in direct line with the sound waves passing out of the open mouth of the horn.

In order to rotate the head, there has been provided a motor 19 disposed within a housing 20 supported upon a suitable support such as the bracket 21 secured to the jacket 9. The worm 22 carried by the shaft of the motor meshes with a worm gear 23 fast upon a shaft 24 journaled in the upper and lower walls of the housing and this shaft carries a large gear 25 which projects through communicating openings formed in the housing and pocket 8 and meshes with a gear 26 fitting tightly upon the inner or lower end portion of the head 14. Since the teeth only extend partially about the gear 25 and the gear 26 is formed with an untoothed segment to bear against the untoothed portion of the gear 25, the gear 25 may continuously rotate but the gear 26 and head of the horn will remain stationary when the untoothed portions of the gears are bearing against each other. Therefore, the horn will rotate intermittently and when stationary its open mouth will always face in the same direction and for an appreciable length of time the sound waves will be directed upwardly along a steady path. This will preferably be directly over the flying field and, therefore, during foggy weather an aviator can determine the exact location of a field and the proper direction in which to make a landing.

It is desired to provide a visible signal as well as an audible one and, therefore, a lamp 27 of suitable size is mounted in a socket 28 upon the head 14 and shielded, as shown at 29, so that its light will be directed in the direction in which the open mouth of the head faces. A wire 30 leads from the socket to a brush 31 secured upon the upper wall of the pocket 8 and this brush bears against a ring 32 of conductive material carried by the gear 26 in insulated relation thereto. Blocks of insulation 33 are provided in spaced relation to each other about the ring 32, and, therefore, the lamp will flicker as the head 14 and gear 26 rotate but will burn steady when the head is stationary. The wire 34 leading from the ring 32 is cut into the circuit 35 of the motor at one side of the battery or other source of electric energy 36 and the wire 11 of the noise producer is cut into this circuit at the other side of the source of energy. The wire 12 leads to the other side of the socket 28 from the wire 30 and a switch 37, such as a telegraph key, is placed in this wire. The switch is normally closed but may be opened and, therefore, when the untoothed portion of the gear 25 is moving across the untoothed portion of the gear 26 and the light and the sound emitting device are energized for an extended interval the key may be operated to interrupt the long dash and send a signal in code indicating the heights of the clouds or fog above the ground. During this interval, the mouthpiece or upper portion of the horn is stationary and, therefore, the light can be more clearly seen and the audible signal more clearly heard from a position approximately in front of the open mouth of the horn and the aviator will be accurately informed as to the location of the field and the direction to make a landing. It will thus be seen that there will be no danger of an aviator failing to locate a landing field or striking the ground before expected when landing. A switch 38 is provided so that operation of the motor may be controlled. In view of the fact that the sound emitting device 10 is disposed in the same circuit as the light, it will be intermittently energized during rotation of the upper portion of the horn and during this movement the audible signal will be emitted as a series of blasts. By a selective arrangement of insulating blocks upon the gear 26 the frequency and duration of the blasts may be controlled and, therefore, a station can be identified by a distinctive series of blasts. A bridge 39 having a switch 40 therein may be provided so that the audible signal may be cut out on clear nights if so desired. A tube 41 is provided so that warm air may be admitted into the horn to melt snow or ice from the walls of the horn if found necessary.

The airship 18 is equipped with a conventional radio receiving set 42 which is equipped with head phones 43 and the usual antenna wire 44 wound upon a drum 45 and electrically grounded upon the eye 46' of a weight 46. This weight instead of being of the usual solid construction is formed with a pocket 47 and within this pocket is disposed a receiver 48 from which extends a wire 49 passed through an insulating tube 50. The wire 49 is covered with insulation and passes up through the cable 51 at one side of the wire 44. The other terminal 52 of the receiver is grounded upon the weight by a screw 53. Fixed rigidly to the drum in insulated relation thereto are annular terminal rings 54 and 55 engaged by brushes 56 and 57 mounted upon a block of insulation 58. Leading from the brush 56 is a wire 59 fixed to a switch arm 60 to be selectively moved into contact with terminals 61 and 62. When the switch is contacting with the terminal 61, a connection will be established between antenna wire 44 and the lead wire 63 of the receiving set 42. When the switch is in engagement with the terminal 62, the plate 64 carried by the switch in insulated relation thereto bridges the terminals 65 and 66 of the telephone circuit wires 67 and 68. This circuit includes a transformer 69 of the usual construction and battery 70 all of which are usual in a conventional telephone circuit. It will thus be seen that by adjusting the switch 60 the head phones may be employed either to receive messages through the radio receiving set or signals from the tower picked up by the receiver 48.

In Fig. 7, there has been shown a simplified receiving mechanism in which the radio receiving set and telephone circuit is omitted. In this form the head phones 71 have their wires 72 directly secured to the brushes 56 and 57 and the receiver instead of being mounted in a weight has both of the wires 44 and 49 directly secured to it. When this form of receiving mechanism is employed, no battery is necessary.

Having thus described the invention, we claim:

1. Air craft signaling means comprising means for emitting an audible signal at an altitude above the ground and directing the same upwardly at an incline and causing the same to move in a path defined by substantially concentric cones having their apexes directed downwardly, and receiving means for use by an occupant of an air craft including a receiver and means to suspend the same at a distance below the airship.

2. Air craft signaling means comprising means for emitting an audible signal at an altitude above the ground and directing the same upwardly at an incline and causing the same to move in a path defined by substantially concentric cones having their apexes directed downwardly, and receiving means for use by an occupant of an air craft comprising a radio receiving set including an antenna wire and head phones, a receiver carried by the antenna wire and adapted to be suspended below the airship thereby, and means to selectively connect the head phones with the receiving set or receiver.

3. Air craft signaling means comprising a tower, sound emitting means, and a horn extending upwardly through the tower from the sound emitting means with its upper end portion projecting above the tower and curved transversely and terminating in an open mouth disposed diagonally upwards and means for imparting motion to the upper portion of the horn whereby its open mouth will travel in an annular path.

4. Air craft signaling means comprising a tower, sound emitting means, a horn extending upwardly through the tower from the sound emitting means with its upper end terminating adjacent the top of the tower, an upper horn section rotatably engaged with the upper end portion of said horn and projecting above the tower and extended transversely and terminating in an open mouth disposed in a diagonal plane whereby sound waves will be directed upwardly from the mouth of the horn at an incline, and means to impart rotary motion to the upper horn section.

5. Air craft signaling means comprising a tower, sound emitting means, a horn extending upwardly through the tower from the sound emitting means with its upper end terminating adjacent the top of the tower, an upper horn section rotatably engaged with the upper end portion of said horn and projecting above the tower and extended transversely and terminating in an open mouth disposed in a diagonal plane whereby sound waves will be directed upwardly from the mouth of the horn at an incline, means to intermittently rotate the upper horn section, an electrically energized lamp carried by the upper horn section, and an energizing circuit for said lamp and sound emitting means including an annular contact rotating with the upper horn section, insulation dividing the contact into spaced segments, and a brush carried by the horn and bearing against the annular contact and insulation during rotation thereof.

6. Air craft signaling means comprising a tower, sound emitting means, a horn extending upwardly through the tower from the sound emitting means with its upper end portion projecting above the tower and formed with an open mouth disposed in a diagonal plane whereby sound waves will be projected upwardly from the horn at an incline, and means for imparting movement to the horn whereby the sound waves projected upwardly therefrom will move in a path defined by substantially concentric cones having their apexes directed downwardly.

7. Air craft signaling means comprising a tower, sound emitting means, a horn extending upwardly through the tower from the sound emitting means with its upper end portion projecting above the tower at an upward incline and terminating in an open mouth, means for rotating the upper portion of the horn, and sound insulating means disposed about the sound emitting means and horn within the tower.

8. Air craft signaling means comprising a tower, sound emitting means, a horn extending upwardly through the tower from the sound emitting means with its upper end terminating adjacent the top of the tower, an upper horn section rotatably engaged with the upper end portion of said horn and projecting above the tower and extended transversely at an upward incline and terminating in an open mouth, a gear fitting about the upper horn section and for the major portion of its circumference formed with teeth, an annular contact carried by said gear and divided into segments by insulation, a brush carried by said horn to contact with exposed portions of the annular contact as the gear and upper horn section are rotated, an energizing circuit for an electric lamp having the annular contact and brush included therein, and drive means including a rotary shaft and a gear carried thereby and having teeth for a portion of its periphery to mesh with the teeth of the first gear.

9. Air craft signaling means comprising sound-emitting means, a horn extending upwardly from the sound-emitting means and at its upper end terminating in an open mouth disposed in a diagonal plane whereby sound waves will be projected diagonally upwards from the horn, and means for imparting movement to the horn to cause its open upper end to move in a path defined by substantially concentric cones having their apexes directed downwardly.

10. Air craft signaling means comprising sound-emitting means, a horn extending upwardly from the sound-emitting means and at its upper end terminating in an open mouth disposed in a diagonal plane whereby sound waves will be projected diagonally upwards from the horn, and means for imparting movement to the upper portion of the horn and causing the open mouth to move in a path defined by substantially concentric cones having their apexes directed downwardly.

11. Air craft signaling means comprising electrically operated sound-emitting means, a horn extending upwardly from the sound-emitting means and terminating in an open mouth disposed in a diagonal plane whereby sound waves will be projected diagonally upwards from the horn, means for rotating said horn, and an energizing circuit for the sound-emitting means including a contact rotating with the horn and divided into insulated segments, and a brush bearing against said contact and successively engaging the segments thereof during rotation thereof.

12. Air craft signaling means comprising electrically operated sound-emitting means, a horn extending upwardly from the sound-emitting means and terminating in an open mouth disposed in a diagonal plane whereby sound waves will be projected diagonally upwards from the horn, means for rotating said horn, and an energizing circuit for the sound-emitting means including a stationary contact and a movable contact moving with the horn and having engagement with the stationary contact to intermittently energize the sound-emitting means during rotation of the horn.

13. Air craft signaling means comprising means for producing an upwardly directed inclined beam of sound waves and causing the beam to move in a path defined by substantially concentric cones having their apexes directed downwardly.

14. Signaling means for identifying aviation fields comprising means for producing an upwardly directed inclined beam of sound waves having a distinctive characteristic for identifying a particular field and causing the beam to move in a path defined by substantially concentric cones having their apexes directed downwardly.

15. Air craft signaling means comprising means for producing an upwardly directed inclined beam of sound waves and causing the beam to move in a path defined by substantially concentric cones having their apexes directed downwardly, and receiving means to be carried by an air craft and acted upon by the sound waves when in the path thereof.

16. Air craft signaling means comprising means for producing an upwardly directed inclined beam of sound waves and causing the beam to move in a path defined by substantially concentric cones having their apexes directed downwardly, and receiving means to be carried by an air craft including a receiver adapted to be acted upon by the sound waves, and means to support the receiver at a distance from the air craft.

17. In a signal for air craft, receiving mechanism for use by an occupant of an airship comprising a receiver, wires electrically connected with opposite terminals of said receiver and adapted to suspend the receiver beneath an airship in appreciably spaced relation thereto, and head phones to be worn by an occupant of the airship having connection with said wires whereby a signal picked up by the receiver may be audibly delivered.

18. In a signal for air craft, receiving mechanism for use by an occupant of an airship comprising a receiver, wires electrically connected with opposite terminals of said receiver and adapted to suspend the receiver beneath an air ship in appreciably spaced relation thereto, a drum having said wires wound thereon, terminal rings extending circumferentially about said drum and having the wires connected therewith, brushes contacting with said rings, conductors leading from said brushes, and head phones connected with said conductors to receive a signal picked up by said receiver.

19. In a signal for air craft, receiving mechanism for use by an occupant of an airship comprising a receiver, wires electrically connected with opposite terminals of said receiver and adapted to suspend the receiver beneath an airship in appreciably spaced relation thereto, a drum having said wires wound thereon, terminal rings extending circumferentially about said drum and having the wires connected therewith, brushes contacting with said rings, conductors leading from said brushes, one of said wires constituting an antenna wire for a radio receiving set, a weight carried by the antenna wire and constituting a carrier for said receiver, a radio receiving set including a lead-in wire and head phones operatively associated with the set, a telephone circuit having the head phones included therein and having one side connected with one of said conductors and its other side provided with open terminals, and a switch having an adjusted element connected with the second conductor and adapted to selectively connect the second conductor with the lead-in wire and open terminals of the telephone circuit.

20. In a signal for air craft, receiving means for use by an occupant of an air craft including a radio receiving set, head phones, an antenna wire, a drum having said wire wound thereon, a weight carried by said wire, a receiver carried by said weight and having one side grounded thereto, a wire leading from the other side of said receiver, insulated terminal rings carried by said drum and having the wires attached thereto, brushes engaging said rings, one brush having secured thereto a wire forming part of a telephone circuit having the head phones included therein, a lead-in wire for the radio receiving set, and a switch connected with the other brush and adapted to be selectively cut into the lead-in wire and telephone circuit.

21. In a signal for air craft, receiving means for use by an occupant of an air craft including a radio receiving set, head phones, an antenna wire, a drum having said wire wound thereon, a weight carried by said wire, a receiver carried by said weight and having one side grounded thereto, a wire leading from the other side of said receiver, insulated terminal rings carried by said drum and having the wires attached thereto, brushes engaging said rings, a lead-in wire for said receiving set, a switch including a circuit closing arm connected with one conductor and a plurality of terminals one of which has the lead-in wire secured thereto, a telephone circuit including a transformer having primary and secondary windings, the primary windings having one end connected with the second brush, a battery having one side connected with the other end of the primary winding and its other side connected with a terminal of said switch whereby a circuit may be closed through the receiver and primary winding, wires leading from other terminals and connected one with one side of the head phones and the other with one end of the secondary winding, a wire leading from the other end of the secondary winding to the other side of the head phones, and a bridge carried by the switch arm to bridge the last-mentioned terminals when the switch arm is moved into position to close the circuit through the receiver and primary winding.

In testimony whereof we affix our signatures.

JOHN P. BUCKLEY.
ARTHUR E. NESBITT.